United States Patent [19]

Evans et al.

[11] 4,218,845
[45] Aug. 26, 1980

[54] BIRD-CALLING DEVICE

[75] Inventors: James T. Evans, 1013 Glynn Oaks Dr., Arlington, Tex. 76010; Robert L. Allen, Arlington, Tex.

[73] Assignee: James T. Evans, Arlington, Tex. by Robert L. Allen

[21] Appl. No.: 44,157

[22] Filed: May 30, 1979

[51] Int. Cl.³ ............................................. A63H 5/00
[52] U.S. Cl. .................................... 46/180; 3/1.3
[58] Field of Search .................. 46/178, 180, 182; 3/1.3

[56] References Cited

U.S. PATENT DOCUMENTS

| | | | |
|---|---|---|---|
| 1,052,525 | 2/1913 | Smith | 46/180 |
| 1,367,176 | 2/1921 | Bridges | 46/180 |
| 2,093,453 | 9/1937 | Kellotat | 3/1.3 |
| 2,745,215 | 5/1956 | Puckette | 46/180 |
| 3,094,778 | 6/1963 | Mailland | 433/177 |
| 3,738,056 | 6/1973 | Schultz | 46/178 |

*Primary Examiner*—F. Barry Shay
*Attorney, Agent, or Firm*—Charles W. McHugh

[57] ABSTRACT

A bird-calling device which is adapted to be securely held in the mouth of a person for use in imitating sounds made by birds—especially wild turkeys. A rigid base is adapted to fit within the roof of a person's mouth, somewhat in the manner of a partial denture plate. The rigid base is uniquely fitted to each person, and it has protruding wires which are located and sized so as to anchor the base to one or more teeth. A U-shaped recess in the rigid base is sized to tightly hold a removable diaphragm assembly. The diaphragm in the assembly is positioned so that it is exposed to selective contact by the user's tongue, preferably in a region well back of the tip of the tongue. When the user expels air past the diaphragm, an imitation bird sound may be produced; and the sound may be varied by changing the position of the user's tongue with respect to the diaphragm.

13 Claims, 8 Drawing Figures

BIRD-CALLING DEVICE

This invention relates generally to sound-producing devices, and more particularly to bird-calling devices which are adapted to be held in the mouth of a person for use in imitating the sounds made by birds—especially wild turkeys.

It is well known to employ diaphragms which are small enough to be held in a person's mouth for imitating the sounds made by wild turkeys and other birds. Exemplary of patents which disclose such devices are U.S. Pat. Nos. 1,367,176 to Bridges and 3,738,056 to Schultz. And, while it is no doubt true that some persons have achieved a definite proficiency in utilizing such devices, it is also true that whatever proficiency is achieved is usually the result of many hours of practice and perhaps some luck in the way that an individual's mouth is formed. For those persons who desire to use a diaphragm-type bird call and who would like to achieve some competence without many hours of experimentation, there has remained a need for improvement. Accordingly, it is an object of this invention to provide a bird-calling device which can produce a high degree of realistic bird calls without the need for tedious hours of experimentation.

Another object is to provide a bird-calling device which is precisely fitted to an individual user's mouth, in order to eliminate the effect of variations in human anatomy which have made it possible for some persons to be unusually successful bird callers and prevented others from achieving similar success.

A further object is to provide an appendage for holding a vibrating diaphragm in a position which fosters the making of desired sounds.

Still another object is to provide a rigid holder for a relatively small diaphragm which is adapted to be placed in a person's mouth, such that the likelihood of swallowing or choking on the small diaphragm is minimized.

One more object is to provide a bird-calling device which can be retained in a person's mouth while permitting conversation in an almost normal manner.

These and other objects will be apparent from a study of the specification and claims appended thereto, and an examination of the drawing in which:

In brief, the invention includes a rigid base made somewhat in the form of a partial denture plate which is adapted to fit snugly in the roof of a user's mouth. The rigid base has protruding wires or the like so that it may be securely anchored to at least one upper tooth. As viewed from the top (or bottom) the base may be said to have a generally U-shaped configuration, with the open portion of the U being toward the front of the user's mouth when it is installed. Within the U-shaped recess is an internally facing narrow groove. A removable diaphragm assembly is sized to provide an air-tight fit within the central recess, with the diaphragm being positioned so that it is exposed to selective contact by the user's tongue. When the user expells air past the diaphragm, an imitation bird sound may be produced; and the sound may be varied by changing the position of the user's tongue, i.e., changing the contact between the diaphragm and the tongue.

Figure 1:
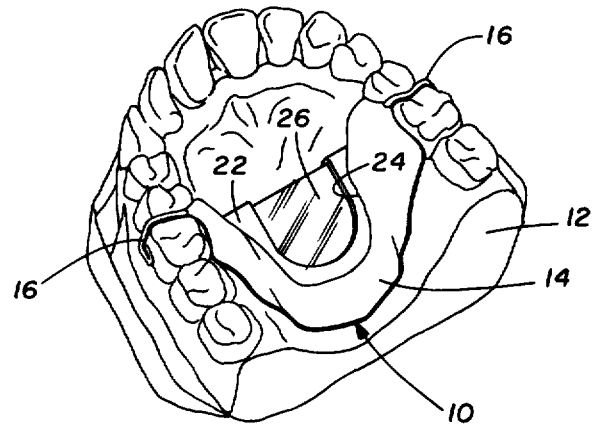
FIG. 1 is a perspective view of a replica of a person's upper teeth and the roof of the user's mouth, with a bird-calling device being mounted in the mold in the same relative position that it would occupy in a user's mouth.

Referring initially to FIG. 1, an exemplary bird-calling device 10 is shown mounted temporarily within a casting made of the roof of the intended user's mouth. Thus, the teeth shown in FIG. 1 are actually inverted from a normal position, in that they are shown as pointed upward from a base 12, whereas a person's actual teeth project downward from his gums. The device 10 is actually built or molded on such a base 12 in order that it will fit snugly in the roof of a user's mouth, so as to permit an air-tight seal between the plastic base 14 and the user's mouth. The rigid base 14 is designed to be securely anchored to at least one upper tooth with a wire or wires 16 in the manner of a conventional partial denture plate. Ideally, the rigid base 14 is anchored to at least two upper teeth, with one tooth anchor being on each side of the user's mouth.

Figure 2:
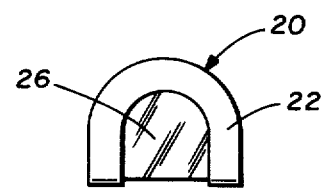
FIG. 2 is a top, plan view of a diaphragm assembly which is adapted to fit within the bird-calling device.
Figure 3:
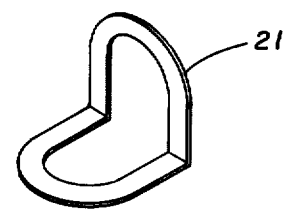
FIG. 3 is a perspective view of an O-shaped element as it is partially bent toward the creation of a U-shaped frame for holding a membrane.

A preferred material for the rigid base 14 is an acrylic plastic of a grade typically used for denture plates, such as that shown in U.S. Pat. No. 3,094,778 to Mailland. The base 14 has a generally U-shaped configuration, with the open portion of the U being toward the front of the user's mouth. The space or gap between the elongated "legs" of the U may be conveniently described as a recess of a given size—into which a removable diaphragm assembly 20 is manually inserted. The diaphragm assembly 20 shown in FIG. 2 includes an external supporting frame 22 shaped like a U and sized to tightly fit within an interiorly facing groove 24 in base 14. The frame 22 is preferably made of a 300-grade stainless steel, such that it is non-corrosive and remains permanently non-toxic in a human mouth, even when exposed to the liquids that are commonly present in a human's mouth, and even if subjected to an occasional scratch. In this respect, the stainless steel frame 22 is superior to previously utilized materials such as anodized aluminum, because a scratch on an anodized aluminum frame can defeat the protection which would otherwise be realized by the anodizing process—thereby exposing some bare aluminum to attack by liquids in the mouth. There are several 300-series steels which are available, but a preferred material is one that is soft enough to be folded back upon itself to produce a U-shaped frame 22 from an O-shaped blank, such as blank 21 shown in FIG. 3. An initial steel thickness of approximately 0.015 inch will provide sufficient rigidity when an 0-shaped member is folded in half to capture a thin membrane between the juxtaposed leg portions of the frame 22. A suitable membrane 26 is a very thin and non-toxic rubber (such as latex rubber), having a thickness of only a few mils (e.g., 0.0015 to 0.008 inch). After an elongated O-shaped element is folded upon itself to produce the U-shaped frame 22, the frame may be bonded together with a non-toxic dental glue such as Cyanobent liquid sold by Ellman Dental Mfg. Co., so as to hold the membrane 26 tautly in the frame. It will be apparent, then, that all of the materials in the diaphragm assembly 20 are permanently non-toxic and corrosion proof.

Figure 4:
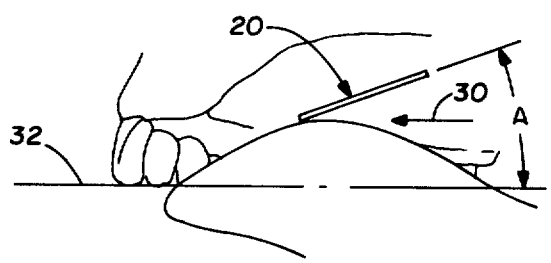
FIG. 4 is a fragmentary and partially sectioned view of a person's mouth, showing an exemplary relative position between a diaphragm assembly and a user's tongue.

Referring additionally to FIG. 4 the diaphragm assembly 20, and hence the diaphragm 26, is exposed in the roof of a person's mouth so that it may be selectively contacted by the user's tongue, such that an imitation bird sound may be produced by expelling air past (and below) the diaphragm in the direction indicated by arrow 30 in FIG. 4. Depending upon the proximity of the tongue to the leading edge of the diaphragm 26, and depending upon the relative position of the tongue in a person's mouth (i.e., projected forward or drawn backward), the user may alter the sound which is produced.

Also indicated in FIG. 4 is a plane 32 which is approximately defined by the bottom of the user's upper teeth. And, as shown, the mounted diaphragm assembly 20 forms an angle A with this plane 32. In the preferred embodiment the angle A is about 40 degrees, but satisfactory devices may be formed by angles within the range of 0 degrees to about 60 degrees. One reason for preferring angles in excess of 0 degrees is to insure a narrow contact line between the user's tongue and a vibrating diaphragm 26 when air is being expelled. With more shallow angles, there is a greater tendency for an elevated tongue to make contact with too much of the diaphragm, causing it to be dampened so much as to be ineffective in making high-pitched imitation bird calls.

Perhaps it is appropriate to mention here that placing the diaphragm 26 where it may be contacted by a user's tongue provides a construction which is readily distinguishable from that shown in the "Artificial Larynx" disclosed in U.S. Pat. No. 2,093,453 to Kellotat. According to Kellotat, his artificial larynx has a vibratory reed which is adapted to produce tones which closely resemble the natural, vocal tones of an individual. But, with the reed being completely enclosed in the Kellotat two-piece housing, there is no opportunity for modulation of any vocal sound through contact between a tongue and a vibrating membrane.

Referring specifically to FIGS. 1 and 4, it will be apparent that the leading edge of an installed diaphragm 26 is a substantial distance back from the user's front teeth. In fact, a distance of at least one inch and preferably about 1¼ inch will typically exist between a person's front teeth and the leading edge of an installed diaphragm. This construction will therefore be significantly different—as far as placement of the vibrating member in a user's mouth—from those shown in U.S. Pat. Nos. 1,367,176 to Bridges and 2,745,215 to Puckette. One reason that this "rear mounted" construction is preferred is that the most forward portions of a person's tongue are known to be his most sensitive portions; and, to place those very sensitive portions against a vibrating diaphragm 26 can produce tactile sensations which are certainly uncomfortable—if not almost intolerable. In fact, any construction which would force a person to subject his tongue to painful vibrations could reasonably be characterized as inoperative, because it is so difficult for a person to exercise sufficient willpower to make him endure a painful sensation on the tip of his tongue. The involuntary reaction that makes a tongue withdraw from uncomfortable vibrations is so pronounced and so consistent as to be a major physiological factor which must be considered in any bird-calling device. Thus, control of the desired interaction between the user's tongue and a vibrating diaphragm 26 is enhanced by insuring that the diaphragm will be firmly positioned in the user's mouth at a location well behind his front teeth, and hence well behind the tip of his tongue.

Figure 6:
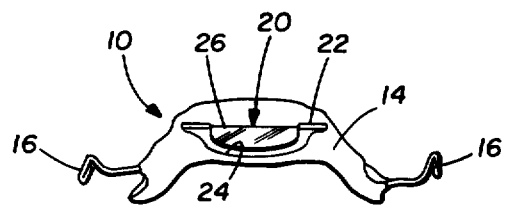
FIG. 6 is a frontal view of the bird-calling device.
Figure 5:
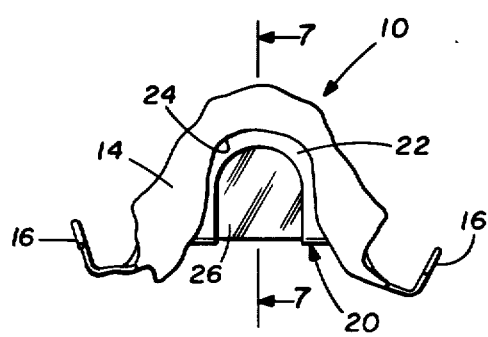
FIG. 5 is a bottom plan view of an assembled bird-calling device.

Referring next to FIG. 5, which is a top view of the bird-calling device 10, the stainless steel wires which are permanently anchored in the plastic base 14 may be clearly seen. These wires may be within the range of about 0.020 to 0.062 inch, in order to have enough rigidity to clamp around any available tooth which is to serve as an anchor. The diaphragm assembly 20 is installed in this figure, and the assembly may also be seen in a generally frontal view of the device shown in FIG. 6.

Figure 7:
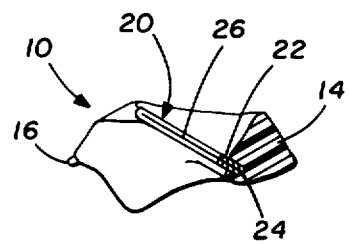
FIG. 7 is a sectioned side elevational view of the device, taken in the plane represented by lines 7—7 in FIG. 6.

FIG. 7 illustrates the mounting arrangement wherein the diaphragm assembly 20 mates with a U-shaped groove in base 14. From a cursory examination of this particular figure, it will be seen that the firm base 14 will safely hold the delicate membrane 26 away from contact with a planar surface, if the device 10 is removed from a person's mouth and temporarily set on a table top or the like.

Figure 8:
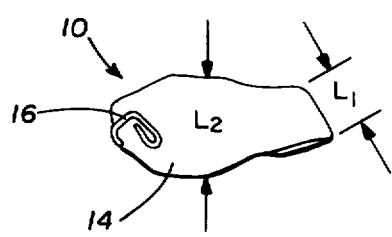
FIG. 8 is a side elevational view of the bird-calling device.

Referring next to FIG. 8, the dimension $L_1$ (shown on the right side of the figure) indicates the thickness of the rearmost surface of body 14 which is in contact with the roof of the user's mouth. In order to foster an air-tight seal between the rigid base and the soft tissues in the roof of a user's mouth, this exterior width (or thickness) is ideally at least one-quarter inch. Toward the front of the device 10, a dimension (indicated as $L_2$) will typically be somewhat wider than $L_1$, in order to provide ample material to foster stability and to secure and hold the spring steel wires 16. The natural saliva in a person's mouth cooperates with the soft mouth tissue to achieve an air-tight seal, so that no exhaled air will escape around the device 10 and defeat the creation of an artificial "echo chamber" above the diaphragm 26.

To create a bird-calling device 10 as disclosed herein, a person must first obtain an accurate mold or casting of the upper part of his mouth, including his teeth and especially the concave roof portion of his mouth cavity. With such a casting to build upon, a technician would then produce a rigid base 14 which exactly matches the mouth cavity, much in the same way that a dentist might prepare a partial denture plate. However, unlike a denture plate, the device 10 will have a relatively large and central recess. The interiorly facing walls of the recess are then provided with a shallow groove 24 which is exactly sized to receive a U-shaped frame 22. Of course, the inclination of the groove 24 with respect to the base 14 will establish the resultant angle between the diaphragm 26 and the user's mouth, so it is formed at the desired angle, e.g., 40 degrees.

The device 10 is completed by preparing and inserting a desired diaphragm assembly. The installation and removal of a diaphragm assembly as shown in FIG. 5 is a simple step that is routinely accomplished by the user, so a diaphragm assembly may be shipped separately from the rigid base 14. To foster ease in removal of an installed diaphragm assembly 20, the groove 24 is preferably made somewhat more shallow than the width of the frame 22, so that at least some of the frame is exposed where it may be grasped by tweezers or a person's fingers. Because the removal of a diaphragm assembly is relatively simple, it is possible for the user to easily change from one diaphragm to another if the first one becomes damaged, or if a particular diaphragm has become stretched to the point that it is no longer tautly held within the frame 22. Also, it would be possible to switch from a single-thickness diaphragm to a double or triple-thickness diaphragm, if the user wished to more easily imitate the more mature sounds of a turkey gobbler instead of a young hen.

When a hunter expects to use the bird-calling device, he will typically remove it from a carrying case and place it in the roof of his mouth, much in the same way that a person would position a partial denture plate. The exact time of inserting the bird-calling device 10 is not critical, because the device may be left in a person's mouth for an extended period of time. And, even though the device 10 is installed in his mouth, the user can still talk (with only minimal distortion) and without dislocating the device. Depending upon the number and location of teeth to which the device is temporarily anchored (and perhaps the selection of suitable wires 16), the user might even cough vigorously or sneeze without in any way changing the position of the device. However, if it should happen that the frame 22 somehow becomes loose and the diaphragm assembly is separated from the base 14, the assembly 20 will at least be positioned in the forward portion of the user's mouth where his tongue can readily manipulate it and it can be expelled. Thus, it is unlikely that a diaphragm assembly which is installed from the front of a base 14 would ever reach the back of a person's mouth, where he might accidentally choke on it. And, of course, the externally protruding wires 16 will almost inevitably give the device 10 a width in excess of two inches; and its length will usually be about 1½ inches. Such a size will essentially preclude the accidental swallowing of the entire device. A typical device is lighweight, normally weighing only about 35 grams, so there should not be the kind of discomfort that might otherwise be experienced by holding a heavy object in the user's mouth.

Another distinct advantage of the device disclosed herein is that it would be possible to substitute a very thin rubber membrane (cut from a product sold in many gasoline service stations and in most every drugstore) for the original membrane 26. That is, rather than have a hunting trip ruined because of an unexpected tear in the specially designed diaphragm assemby 20 shown herein, the owner of the device 10 could achieve at least some sort of temporary "fix" by tightly stretching another membrane across the U-shaped frame 22, and then wedging said frame into the prepared groove 24. After appropriate sterilizing steps, the repaired device 10 would then probably be in condition for at least passable use in calling wild turkeys. After the hunter returned to his home, he could then restore the device 10 to like-new condition by installing a new diaphragm which has more carefully controlled parameters (an area of about 0.4 square inch, a uniform thickness, etc.).

While only a few embodiments of the invention have been disclosed herein in great detail, it should be readily apparent to those skilled in the art that modifications thereof may be accomplished without departing from the spirit and scope of the invention—which is particularly identified in the claims appended hereto.

What is claimed is:

1. A bird-calling device adapted to fit within a user's mouth, comprising:

(a) a rigid base adapted to fit snugly in the roof of a user's mouth and having means adapting it to be securely anchored to at least one upper tooth, and the base having a generally U-shaped configuration with the open portion of the U being toward the front of the user's mouth when the base is fitted therein, and the closed portion of the U being configured on its top to produce an essentially air-tight seal with the roof of the user's mouth, and the base open position forming a central recess of a given size, said recess having attachment means associated with its walls; and (b) a removable diaphragm assembly which cooperates with said attachment means to be secured thereby, with its leading edge being spaced inwardly from the user's front teeth when the base is fitted in the user's mouth, said diaphragm being sized to provide an air-tight fit within the central recess of the rigid base, and the diaphragm being exposed to selective contact by the user's tongue, whereby an imitation bird sound may be produced by expelling air past the diaphragm, and whereby the user may alter the sound by selectively varying the contact between the diaphragm and his tongue.

2. The device as claimed in claim 1 wherein the central recess in the rigid base extends all the way to the front of the base, and said recess has a width which permits the removable diaphragm assembly to be inserted into the recess from the front of the base.

3. The device as claimed in claim 2 wherein the recess and the removable diaphragm assembly are configured for sliding engagement with each other, and the diaphragm assembly engages the recess from the front thereof.

4. The device as claimed in claim 1 wherein the attachment means comprises an interiorly facing groove which forms a U-shaped receptacle for the diaphragm assembly, and the diaphragm assembly has an external supporting frame that is sized so as to tightly fit within said interiorly facing groove.

5. The device as claimed in claim 1 wherein the rigid base is individually and uniquely fitted into the mouth of the user in the manner of a partial denture plate.

6. The device as claimed in claim 1 wherein the rigid base is temporarily anchored with wires to at least two upper teeth, with one tooth anchor being on each side of the user's mouth.

7. The device as claimed in claim 1 wherein the bird-calling device is adapted for calling wild turkeys, and the removable diaphragm has a surface area of about 0.40 square inch.

8. The device as claimed in claim 1 wherein the bottom of the U-shaped member has a thickness of at least one-quarter inch in contact with the roof of the mouth, whereby an excellent seal is fostered between the rigid base and the roof of the user's mouth.

9. The device as claimed in claim 1 wherein the bottoms of the user's upper teeth form an approximate plane, and wherein the installed diaphragm makes an angle with respect to said plane which is within the range of about zero degrees to 60 degrees.

10. The device as claimed in claim 4 wherein the frame which supports the diaphragm is made of 300-series stainless steel, whereby all of the materials in the diaphragm assembly may be properly categorized as permanently non-toxic and corrosion proof.

11. The device as claimed in claim 1 wherein the diaphragm is positioned such that its leading edge is at least one inch from the user's front teeth, whereby contact between the tip of a user's tongue and a vibrating diaphragm is essentially precluded, and whereby control of the desired interaction between the user's tongue and the vibrating diaphragm is enhanced.

12. The device as claimed in claim 1 wherein the rigid base is formed of non-porous acrylic material which is adapted for use in making denture plates, and wherein the total weight of the device is about 35 grams.

13. The device as claimed in claim 1 wherein the total width of the device is in excess of two inches and wherein the total length is about 1½ inches, such that the device has dimensions that are sufficiently large as to essentially preclude swallowing the entire device.

* * * * *